United States Patent
Petillon (10) Patent No.: US 12,049,303 B2
(45) Date of Patent: Jul. 30, 2024

(54) METHOD AND DEVICE FOR DETERMINING A STATE OF A ROTORCRAFT ROTOR

(71) Applicant: AIRBUS HELICOPTERS, Marignane (FR)

(72) Inventor: Jean-Paul Petillon, Le Vigan (FR)

(73) Assignee: AIRBUS HELICOPTERS, Marignane (FR)

( * ) Notice: Subject to any disclaimer, the term of this patent is extended or adjusted under 35 U.S.C. 154(b) by 304 days.

(21) Appl. No.: 17/229,146

(22) Filed: Apr. 13, 2021

(65) Prior Publication Data

US 2021/0362846 A1    Nov. 25, 2021

(30) Foreign Application Priority Data

May 20, 2020   (FR) ...................................... 2005323

(51) Int. Cl.
*B64C 27/57*   (2006.01)
*B64C 27/00*   (2006.01)
*G01C 19/06*   (2006.01)
*G05D 1/00*    (2006.01)

(52) U.S. Cl.
CPC .......... *B64C 27/008* (2013.01); *G01C 19/065* (2013.01); *G05D 1/0669* (2013.01)

(58) Field of Classification Search
CPC .... B64C 2027/7233; B64C 2027/7216; B64C 27/54; B64C 27/008
See application file for complete search history.

(56) References Cited

U.S. PATENT DOCUMENTS

| | | | |
|---|---|---|---|
| 3,945,256 A * | 3/1976 | Wilson | G01M 1/28 244/17.27 |
| 3,954,229 A * | 5/1976 | Wilson | B64C 27/001 73/462 |
| 4,023,409 A | 5/1977 | Durand | |
| 4,937,758 A * | 6/1990 | Hayden | B64C 27/008 244/17.11 |
| 9,758,258 B2 | 9/2017 | Fang et al. | |
| 2010/0063767 A1 * | 3/2010 | Moir | B64C 27/008 356/614 |

(Continued)

FOREIGN PATENT DOCUMENTS

| | | |
|---|---|---|
| EP | 2433866 A2 | 3/2012 |
| EP | 2433866 A3 | 3/2015 |

(Continued)

OTHER PUBLICATIONS

French Search Report for French Application No. FR 2005323, Completed by the French Patent Office, Dated Feb. 1, 2021, 9 pages.

*Primary Examiner* — Christopher D Hutchens
(74) *Attorney, Agent, or Firm* — Brooks Kushman P.C.

(57) ABSTRACT

A device for determining a state of a rotor of a rotorcraft. The rotorcraft comprises a fuselage and a main rotor provided with a hub rotating about a mast of the rotor and with a plurality of blades whose second ends describe a trajectory defining a tip path plane. The device includes a sensor for measuring an angular velocity of a blade about a pitch axis. The device thus makes it possible to determine a state of the rotor, comprising, for example, estimates of a longitudinal cyclic pitch and of a lateral cyclic pitch of the blade with respect to the tip path plane.

13 Claims, 5 Drawing Sheets

(56) References Cited

U.S. PATENT DOCUMENTS

| | | | | |
|---|---|---|---|---|
| 2014/0084105 A1* | 3/2014 | Eglin | ............................ | B64C 27/57 |
| | | | | 244/6 |
| 2014/0145025 A1* | 5/2014 | Fang | ........................ | B64C 27/008 |
| | | | | 244/17.11 |
| 2014/0271188 A1* | 9/2014 | Dillon | ..................... | B64C 27/008 |
| | | | | 416/61 |
| 2015/0028152 A1* | 1/2015 | Eller | ........................ | B64C 27/008 |
| | | | | 244/17.13 |
| 2015/0210382 A1 | 7/2015 | Dempsey et al. | | |
| 2015/0266591 A1* | 9/2015 | Petillon | .................... | G08G 5/045 |
| | | | | 244/221 |
| 2016/0153775 A1 | 6/2016 | Hocquette | | |
| 2017/0203838 A1* | 7/2017 | Thomas | ..................... | B64C 27/78 |
| 2019/0023387 A1* | 1/2019 | Davis | ........................... | F16C 7/06 |
| 2019/0112038 A1* | 4/2019 | Redaelli | ...................... | B64C 27/78 |
| 2019/0308721 A1* | 10/2019 | Kakaley | ..................... | B64C 27/57 |
| 2020/0292410 A1* | 9/2020 | Covington | ............. | G01M 5/0016 |

FOREIGN PATENT DOCUMENTS

| | | |
|---|---|---|
| EP | 3025958 A1 | 6/2016 |
| EP | 3201084 A1 | 8/2017 |
| FR | 2282644 A1 | 3/1976 |
| FR | 2565270 A1 | 12/1985 |
| FR | 2961306 A1 | 12/2011 |
| WO | 2016054136 A1 | 4/2016 |
| WO | 2018081802 A1 | 5/2018 |

\* cited by examiner

METHOD AND DEVICE FOR DETERMINING A STATE OF A ROTORCRAFT ROTOR

CROSS REFERENCE TO RELATED APPLICATIONS

This application claims priority to French patent application No. FR 20 05323 filed on May 20, 2020, the disclosure of which is incorporated in its entirety by reference herein.

BACKGROUND OF THE INVENTION

(1) Field of the Invention

The present invention lies in the field of control installations equipping rotorcrafts.

(2) Description of Related Art

The present invention relates to a method for determining a state of a rotorcraft rotor, this state comprising, in particular, the longitudinal and lateral cyclic pitches of a blade of this rotor with respect to the tip path plane of this rotor, as well as the cone angle formed by the blades of this rotor. The present invention also relates to a device for determining such a rotor state. This method and this device are based on utilizing the sinusoidal oscillations of the pitch of the rotorcraft rotor blades measured by a rate gyro.

A rotorcraft generally comprises at least one lift rotor, conventionally referred to as the "main rotor", positioned above a fuselage of the rotorcraft, and possibly an anti-torque rotor for controlling the yaw movements of the rotorcraft, located at the rear end of a tail boom of the rotorcraft, for example.

The main rotor includes a mast, a hub and blades. The mast is secured to the hub and rotates the hub and the blades about an axis of the mast. Each blade is also able to rotate about one or more articulation axes, namely a pitch axis, a flapping axis and a drag axis.

An orthonormal reference frame is usually defined with respect to the fuselage of the rotorcraft by three particular axes: a longitudinal axis oriented from the rear of the rotorcraft towards the front of the rotorcraft, a normal axis oriented from top to bottom perpendicular to the longitudinal axis, and a lateral axis oriented from left to right perpendicular to the longitudinal and normal axes. These axes thus define a reference frame linked to the fuselage, usually referred to as a "body frame".

The longitudinal and lateral axes are generally chosen in such a way that the plane which they form is substantially horizontal at the mean cruising speed of the rotorcraft. The longitudinal and normal axes form a plane of symmetry of the fuselage of the aircraft.

The cyclic component of the pitch of a rotor blade is defined as the deviation from the mean of said pitch over one complete revolution of said blade. Said deviation from the mean is a substantially sinusoidal signal at the frequency of rotation of the rotor, of the form $\theta_1 \cdot \sin(\psi+\varphi)$ where $\theta_1$ is the amplitude of the cyclic pitch, $\psi$ is the azimuth of the blade, and $\varphi$ is the phase of the cyclic pitch. This phase depends on the choice of the origin of the azimuths. If the origin of the azimuths is defined as the orientation of the blade when it passes through the plane of symmetry of the fuselage with its free end oriented rearwards, the longitudinal component of the cyclic pitch is the amplitude of the sine component, and the lateral component is the amplitude of the cosine component:

$$\theta_1 \cdot \sin(\psi+\varphi) = \theta_{1S} \cdot \sin(\psi) + \theta_{1C} \cdot \cos(\psi),$$

where $\theta_{1S}$ is the longitudinal cyclic pitch and $\theta_{1C}$ is the lateral cyclic pitch.

Furthermore, a plane referred to as the "hub plane" is perpendicular to the axis of the mast of a rotor and is designated by the acronym HP. Moreover, while they rotate, the free ends of the rotorcraft rotor blades describe trajectories that are substantially planar and substantially identical for all the blades of the rotor. The plane of said trajectories is referred to as the "Tip Path Plane", denoted by the acronym TPP.

The state of a rotorcraft rotor may comprise, in particular, the mean flap angle $\beta_0$ and the longitudinal $\beta_{1C}$ and lateral $\beta_{1S}$ inclinations of the tip path plane of this rotor.

It should be noted that the collective pitch $\theta_0$ of a rotor blade is invariant to changes in the reference plane, in particular between the tip path plane TPP and the hub plane HP. Conversely, the lateral $\theta_{1C}$ and longitudinal $\theta_{1S}$ cyclic pitches of the rotor blade depend on the reference plane. The lateral $\theta_{1C}$ and longitudinal $\theta_{1S}$ cyclic pitches of the blade are in particular different depending on whether they are expressed with respect to the tip path plane TPP or rather with respect to the hub plane HP.

In particular, measurements made on the lateral $\theta_{1C}$ and longitudinal $\theta_{1S}$ cyclic pitch control channel provide an angle of the rotor blades with respect to the hub plane HP.

Concerning the prior art for measuring a state of a rotor, document U.S. Pat. No. 9,758,258 is known, which describes a system for monitoring the position and movements of the blades of a main rotor of a rotorcraft by means of a first sensor positioned on the blade and a second sensor, referred to as the reference sensor, positioned on the hub of the main rotor of the rotorcraft. These two sensors, positioned on the blade and on the hub, may comprise, for example, rate gyros and/or accelerometers in order to measure components of linear accelerations and/or angular velocities of the blade and of the non-flapping region of the hub situated opposite the blade root. The use of a flapping sensor (that of the blade) and of a non-flapping sensor (the reference) has the effect of making their installation and operation complex. Furthermore, according to this document and with regard to the estimation of the angles of the blades, the measurements of the sensors should, over time, be integrated. This type of processing may give rise to unacceptable angle errors.

Document WO 2018/081802 is also known, which describes a system for detecting the state of a rotorcraft rotor, which state consists, for example, of the angular positions of each of the blades, in order to monitor the actual elongations of the articulations and to assist in the maintenance of said articulations. This system uses various sensors positioned, for example, in the elastomeric spherical thrust-bearings of the blades or else directly on the blades. These sensors make it possible to measure the flap, drag and/or pitch angles of the blades or indeed the accelerations in certain regions of these blades. These sensors are, for example, accelerometers, strain gauges, piezoelectric sensors, or indeed linear or rotary displacement sensors of the LVDT or RVDT type, standing for "Linear/Rotary Variable Differential Transformer". The latter type of sensor comprises several members that move relative to one another, thus constituting fragile mechanisms.

Documents FR 2 282 644 and FR 2 565 270 are also known, which describe an anemometer using, in particular, measurements of the position of the cyclic pitch control of the blades of the main rotor in order to determine the longitudinal and lateral components of the air speed.

This anemometer also uses measurements of two components of the specific force vector of the rotorcraft, along the longitudinal and lateral axes respectively. These measurements of components of the specific force vector make it possible to estimate the inclination of the tip path plane TPP with respect to the plane of the fuselage formed by the longitudinal and lateral axes of the body frame. However, this estimate disregards the aerodynamic forces and thrust of the rear rotor, and is therefore marred by a high degree of inaccuracy.

Systems are also known for measuring the angular displacement of the blades of a rotating rotor based on cameras arranged on the non-flapping part of the rotating hub, associated with image processing software. The complexity of such a device makes it difficult to deploy on rotorcrafts in commercial operation. In addition, the use of images makes this system dependent on ambient light.

In addition, document US 2015/0210382 describes a device and a method applied to a rotorcraft comprising a rotor provided with blades. Data is obtained from a plurality of sensors located on the rotorcraft and associated with a hub of this rotor and with the blades of this rotor. The sensors may include accelerometers located on a blade and provide data regarding angles, speeds, accelerations, or indeed positions of the blade. This data may be processed in conjunction with a processing system in order to obtain one or more states associated with the operation of the rotorcraft, for example the cone angle of the rotor, or the inclination of the tip path plane TPP.

Document EP 2 433 866 describes a system for balancing a rotor for a rotorcraft comprising a data processing unit, a speed sensor and at least one accelerometer. The speed sensor is mounted close to the rotorcraft rotor blades, for example on the fuselage of the rotorcraft, beneath the rotor, and allows the speed of rotation and the position of the blades to be measured. The speed of rotation and the position of the blades as detected by the speed sensor then make it possible to calculate the masses and their optimum locations on the blades in order to compensate for the vibratory anomalies encountered on the rotor.

The technological background of the invention includes, in particular, documents EP 3 025 958, FR 2 961 306 and EP 3 201 084.

BRIEF SUMMARY OF THE INVENTION

The aim of the present invention is to overcome the above-mentioned limitations of the prior art and to accurately and robustly measure a state of a rotorcraft rotor.

One object of the present invention is a method for determining a state of a rotorcraft rotor.

The rotorcraft comprises a fuselage and at least one rotor provided with a mast, a hub and a plurality of blades. Each blade comprises a first connected end and a second free end. The hub is connected to the mast and rotates about an axis A1 of the mast. Each blade is connected by its first end to the hub. Each blade is able to rotate about at least one articulation axis of the blade, the second free end of a blade describing, during a rotation of the hub about the axis A1, a trajectory close to a mean plane referred to as the "tip path plane TPP".

A reference frame (X, Y, Z) is defined, linked to the rotor, but not rotating with respect to the fuselage of the rotorcraft. The longitudinal axis X of said reference frame is formed by the projection onto the tip path plane TPP of the longitudinal axis of the body frame attached to the rotorcraft and oriented from the rear of the rotorcraft towards the front of the rotorcraft, the lateral axis Y of said reference frame is included in the tip path plane, perpendicular to said longitudinal axis X, and oriented from left to right, and the normal axis Z of said reference frame is oriented perpendicular to the tip path plane TPP, from top to bottom. The tip path plane TPP is thus formed by the longitudinal X and lateral Y axes.

This method is remarkable in that it includes the following steps:

directly measuring the change over time of an angular velocity component $\omega(t)$ of a blade about an articulation axis with respect to an inertial reference frame; and determining a state of a rotor by processing the angular velocity component $\omega(t)$.

This method consists in using direct measurements of the change over time of an angular velocity component $\omega(t)$ of a blade, carried out on one or more blades of a rotor directly in the body of said blade or blades. In the preferred embodiment of the present invention, said rotor is a main rotor of the rotorcraft, providing lift and propulsion for the rotorcraft. However, implementing the method on an anti-torque rear rotor, or even a propeller for propelling the rotorcraft, does not go beyond the ambit of the present invention. Said direct measurements can advantageously be taken from a rate gyro, for example of the "Micro-Electro-Mechanical System" or MEMS type, the reliability of which is known due to their monolithic structure, thus making the method according to the invention more robust than that known from the prior art. Said direct measurements may also be taken from a rate gyro of another type or indeed from another device for determining an angular velocity.

The expressions "directly measuring" and "direct measurement" mean that the measurement is carried out directly in the tip path plane TPP, solely by means of at least one sensor secured to a blade, and without using additional information relating to an instant when the blade passes a fixed marker attached to the fuselage of the rotorcraft.

Each blade is connected to the hub and is able to move with respect to the hub about at least one articulation axis, namely a pitch axis, a flapping axis and/or a drag axis. For example, the pitch axis may be constituted by a straight line contained in the blade, integral with the blade and forming a radius of the rotor disk. Similarly, the flapping axis may be constituted by a straight line integral with the blade, perpendicular to the pitch axis, and whose direction is a tangent to the periphery of the rotor disk at the tip of the free end of said blade. The drag axis may be constituted by a straight line integral with the blade and normal to the rotor disk. Each blade may be connected to the hub, for example by means of a mechanical articulation or else by means of a flexible connection. The axes of the three articulations may be concurrent and the three articulations may consist of a single spherical thrust-bearing.

During the first step of the method according to the invention, the direct measurement of the change over time of the angular velocity component $\omega(t)$ of a blade about an articulation axis of the blade with respect to an inertial reference frame is carried out by means of at least one sensor secured to the blade. Each sensor comprises at least one rate gyro. Said at least one articulation axis of a blade comprises at least one pitch axis. A sensitive axis of at least one rate gyro is, for example, oriented parallel to this pitch axis of the blade. In the event that a single measurement axis is used during this measurement step, favoring the pitch axis allows the states of the rotor to be observed in the most comprehensive manner.

However, the sensors available on the market and suitable for use in the context of the invention are for the most part multi-axis sensors, for example MEMS rate gyros referred to as "XYZ" or "3D" rate gyros, without compromising either in terms of the price or the complexity thereof. Thus, each sensor may advantageously comprise a multi-axis rate gyro, typically a triaxial rate gyro, with three sensitive axes arranged so as to determine, directly or by calculation, a projection of the measurements of this rate gyro on the pitch axis of the blade, regardless of the orientations of its sensitive axes. For example, each sensor includes one or more inertial micro-sensors of the MEMS type that are robust and capable of withstanding the environment of a blade.

Similarly, each sensor may comprise gyrometric sensitive axes arranged so as to be respectively oriented, for example, parallel to the pitch axis, to the flapping axis and to the drag axis of the blade. Alternatively, the sensitive axes may be arranged along diagonal axes of the reference frame {pitch, flapping, drag}. The projections on the desired axes are then reconstituted by calculation. In addition, a blade of the rotor may also comprise an accelerometer whose sensitive axis is arranged parallel to the flapping axis of the blade in order to evaluate the static value of the angle of the blade about the drag axis.

A device using rate gyros and in particular MEMS type rate gyros is thus more precise and far more robust than cameras or rotary or linear displacement sensors of the RVDT/LVDT type.

This direct measurement of the change over time of the angular velocity component ω(t) of a blade is performed with respect to a reference frame referred to as an "inertial" reference frame, i.e., a reference frame whose axes point in fixed directions with respect to distant stars.

During the second step of the method according to the invention, the determination of a state of a rotor is carried out following the processing of said angular velocity component ω(t) of the blade about an articulation axis of the blade.

Indeed, the angular velocity of a rotor blade about an articulation axis of the blade can be likened to the sum of the derivative with respect to time of the angle of the blade about this articulation axis, and the projection of the speed of rotation of the rotor hub. In addition, the angle of a rotor blade about an articulation axis of the blade is a periodic function of time, the period of which is equal to that of revolution of the rotor. Consequently, the angular velocity of the blade about this articulation axis is also a periodic function of time. The angle and its derivative can be expressed in the form of a Fourier series development.

For example, when an articulation axis of the blade is the pitch axis of the blade, the angle θ of a blade about its pitch axis can be resolved into the collective pitch $\theta_0$, the longitudinal cyclic pitch $\theta_{1S}$ controlling the longitudinal inclination of the rotor disk about the lateral axis Y of the non-rotating reference frame (X, Y, Z) attached to the rotor and the lateral cyclic pitch $\theta_{1C}$ controlling the lateral inclination of the rotor disk about the longitudinal axis X of this reference frame (X, Y, Z). This angle θ is a periodic function of time t, the period of this function being equal to $2\pi/\Omega$, $\Omega$ being the speed of rotation, in radians per second, of the rotor hub about the axis A1 of the rotor mast. This angle θ of a blade can thus be expressed in the form of a Fourier series development as a function of time t such that:

$$\theta=\theta_0+\theta_{1S}\cdot\sin(\Omega\cdot t)+\theta_{1C}\cdot\cos(\Omega\cdot t)+\theta_{2S}\cdot\sin 2(\Omega\cdot t)+\theta_{2C}\cdot\cos 2(\Omega\cdot t)\ldots,\quad (E1)$$

where:

$\theta_0$: continuous component;

$\theta_{1C}$ and $\theta_{1S}$: coefficients of the fundamental component, also referred to as the harmonic component of order 1, corresponding to the frequency $\Omega/2\pi$;

$\theta_{iC}$ and $\theta_{iS}$: coefficients of the harmonic of order i, i being an integer greater than or equal to 2, of usually insignificant amplitudes on a rotor whose blade pitches are controlled by a swashplate; and $\Omega$: the speed of rotation of the rotor hub, expressed in radians per second.

The collective pitch $\theta_0$ is the continuous component of this Fourier series decomposition, and therefore corresponds to a mean value of the angle θ over one complete revolution of the blade. The lateral cyclic pitch $\theta_{1C}$ and the longitudinal cyclic pitch $\theta_{1S}$ are the coefficients of the cosine and sine functions of the harmonic of order 1, or fundamental harmonic, of this Fourier series decomposition. It is known that, in the case of a rotor controlled by a conventional swashplate, the oscillations of the blades about their pitch axis are sinusoidal functions with a frequency equal to that of rotation of the rotor. The Fourier series development of the angle θ of a blade can therefore be truncated to the harmonic of order 1 (or fundamental harmonic), and can be written as follows:

$$\theta=\theta_0+\theta_{1S}\cdot\sin(\Omega\cdot t)+\theta_{1C}\cdot\cos(\Omega\cdot t).\quad (E2)$$

Furthermore, should be noted that the collective pitch $\theta_0$ of a blade is invariant to changes to the reference plane (tip path plane TPP or hub plane HP, for example). Conversely, the lateral $\theta_{1C}$ and longitudinal $\theta_{1S}$ cyclic pitches of the blade are different depending on whether they are expressed with respect to the tip path plane TPP or rather with respect to the hub plane HP. The relations for the transition from the tip path plane TPP reference to the hub plane HP reference for the lateral $\theta_{1C}$ and longitudinal $\theta_{1S}$ cyclic pitches can be written, for example, in the case of a rotor without pitch-flap coupling, as follows:

$$\theta_{1C/TPP}=\theta_{1C/HP}+\beta_{1S},\quad (E3)$$

$$\theta_{1S/TPP}=\theta_{1S/HP}-\beta_{1C},\quad (E4)$$

where:

$\theta_{1S/TPP}$ and $\theta_{1C/TPP}$: estimates of the longitudinal and lateral cyclic pitches of a blade of the rotor with respect to the tip path plane TPP;

$\theta_{1S/HP}$ and $\theta_{1C/HP}$: estimates of the longitudinal and lateral cyclic pitches of a blade of the rotor with respect to the hub plane HP; and $\beta_{1C}$ and $\beta_{1S}$: inclination of the tip path plane with respect to the hub plane HP respectively about the lateral axis Y and about the longitudinal axis X.

For the other types of rotor having non-zero pitch-flap coupling, the relations E3 and E4 must be generalized by taking into account a pitch-flap coupling coefficient also referred to, for example, as the "Delta 3 angle" or "$\delta_3$ angle".

The angle $\theta_{TPP}$ of a blade can then be expressed with respect to the tip path plane TPP by the relation:

$$\theta_{TPP}=\theta_0+\theta_{1S/TPP}\cdot\sin(\Omega\cdot t)+\theta_{1C/TPP}\cdot\cos(\Omega\cdot t).\quad (E5)$$

During the first step of the method according to the invention, the angular velocity component $\omega_\theta(t)$ of a blade about an articulation axis of the blade, for example the pitch axis, was measured.

The angular velocity $\omega_\theta(t)$ of the blade about its pitch axis can be likened to the sum of the derivative with respect to time t of the angle $\theta_{TPP}(t)$ of the blade about this pitch axis, and the projection of the speed of rotation of the rotor hub. Consequently, the angular velocity $\omega_\theta(t)$ of the blade about its pitch axis is a periodic function of time, as is the angle $\theta_{TPP}$. The angular velocity $\omega_\theta(t)$ can thus be expressed, disregarding the possible tilting speed of the tip path plane TPP, in the form of a Fourier series development:

$$\omega_\theta(t) = \Omega \cdot \sin \beta_0 + \Omega \cdot \theta_{1S/TPP} \cdot \cos(\Omega \cdot t) - \Omega \cdot \theta_{1C/TPP} \cdot \sin(\Omega \cdot t), \quad (E6)$$

where:

$\Omega \cdot \sin \beta_0$: mean value, or "continuous component", constituting the projection of the speed of rotation of the rotor hub; $(\Omega \cdot \theta_{1S/TPP})$ and $(-\Omega \cdot \theta_{1C/TPP})$: harmonic coefficients of order 1, corresponding to the frequency $\Omega/2\pi$; and $\beta_0$: elevation angle of the blade with respect to the tip path plane TPP, characterizing the rotor cone angle.

Consequently, an estimate of the elevation angle $\beta_0$ of the blade with respect to the tip path plane TPP, also referred to as the rotor "cone angle" or indeed the "mean flap angle", as well as estimates of the longitudinal $\theta_{1S/TPP}$ and lateral $\theta_{1C/TPP}$ cyclic pitches of the blade with respect to the tip path plane TPP, can advantageously be obtained solely from the angular velocity component $\omega_\theta(t)$ of the blade about its pitch axis and the angular velocity $\Omega$ of the rotor about the axis A1 of its mast.

These estimates of the rotor cone angle $\beta_0$ and of the longitudinal $\theta_{1S/TPP}$ and lateral $\theta_{1C/TPP}$ cyclic pitches of the blade are determined by extracting, respectively, a mean value of the angular velocity $\omega_\theta(t)$, as well as an amplitude and a phase of the sinusoidal component of order 1 of the angular velocity $\omega_\theta(t)$.

These estimates of the rotor cone angle $\beta_0$ and of the longitudinal $\theta_{1S/TPP}$ and lateral $\theta_{1C/TPP}$ cyclic pitches of the blade can be obtained by calculating the coefficients of the Fourier series decomposition of the angular velocity $\omega_\theta(t)$, then by dividing said coefficients by the speed of rotation $\Omega$ of the rotor hub about the axis A1. Such a processing operation may be a harmonic analysis of the angular velocity component $\omega_\theta(t)$. It should be noted that this processing of the angular velocity component $\omega_\theta(t)$ allowing the separation of the longitudinal and lateral cyclic pitch components requires the rotor phase to be known. For this purpose, in a preferred embodiment of the invention, a synchronous signal from a blade passing in front of a marker secured to the fuselage is also utilized in order to obtain a Fourier series decomposition suitably phased, or coherent, with the orientation of the rotor. Such processing of the angular velocity component $\omega_\theta(t)$ is then the equivalent to "synchronous demodulation".

In addition, this cone angle $\beta_0$ is generally small, typically less than 10°. In fact, by applying small-angle approximation, the mean value of the angular velocity $\omega_\theta(t)$ can be written as follows: $\Omega \cdot \beta_0$.

Consequently, a decomposition of the angular velocity $\omega_\theta(t)$ makes it possible to isolate its mean value, and then to deduce therefrom the cone angle $\beta_0$ between the tip path plane TPP and the blade. The rotor cone angle may then be determined.

In this way, the state of said rotor determined during the second step of the method according to the invention comprises at least one cyclic pitch angle of the blade with respect to the tip path plane TPP determined following the extraction of an amplitude and possibly of a phase of the fundamental sinusoidal component of the angular velocity $\omega(t)$ of the blade about an articulation axis of the blade.

The state of said rotor determined during the second step of the method according to the invention may also comprise the rotor cone angle $\beta_0$ determined following the extraction of a mean value of the fundamental sinusoidal component of the angular velocity $\omega(t)$ of the blade about an articulation axis of the blade.

It is also possible, for example, to use any one of the following methods for extracting the mean value, as well as the amplitude and possibly the phase of the fundamental sinusoidal component of the angular velocity $\omega(t)$ of the blade:

Fourier series decomposition;
solving a system of three equations with three unknowns utilizing the instantaneous measurements on three different blades;
solving a system of N equations with three unknowns utilizing the instantaneous measurements of N blades, N being an integer strictly greater than 3, the overdetermination of N with respect to 3 being processed, for example, by the least squares method;
synchronous demodulation;
recursive least squares method;
non-recursive least squares method; and
Kalman filtering.

Using the angular velocity component $\omega_\theta$ of a blade about its pitch axis in order to determine the estimates of the longitudinal $\theta_{1S/TPP}$ and lateral $\theta_{1C/TPP}$ cyclic pitches of the blade advantageously allows this method to eliminate one of the main faults of most sensors, which is bias and, above all, bias instabilities. Indeed, bias affects only the measurement of the continuous component of the observed periodic signal, whereas the longitudinal $\theta_{1S/TPP}$ and lateral $\theta_{1C/TPP}$ cyclic pitches generate the alternating components at the fundamental frequency of the periodic signal of the angular velocity $\omega_\theta(t)$ of the blade about its pitch axis.

In addition, these longitudinal $\theta_{1S}$ and lateral $\theta_{1C}$ cyclic pitches are estimated directly with respect to the tip path plane TPP. Consequently, in applications in which the aim is to estimate the pitches of one or more blades with respect to this TPP reference frame, the uncertainty associated with the estimate of the inclination of this tip path plane TPP with respect to the conventionally used hub plane HP is eliminated, as is the accumulation of potential errors of the two sensors used, namely a sensor measuring the cyclic pitch of a blade with respect to the HP and another sensor measuring the inclination of the tip path plane TPP with respect to the hub plane HP.

The method for determining a state of a rotor according to the invention may further comprise one or more of the following characteristics, taken individually or in combination.

According to one aspect, the method according to the invention may include an intermediate step of detecting the instant a first marker attached to said rotor passes in front of a second marker attached to said fuselage. This detection makes it possible to estimate, by implementing, for example, a phase-locked loop, the angular position $\psi$ about the axis A1 of the rotor mast, also referred to as the "azimuth", of each blade at each instant, and in particular of each blade equipped with a sensor. This detection of the passing instant may be embodied by a device delivering a pulse each time the first marker attached to the rotor passes in front of the second marker attached to the fuselage, i.e., a pulse for each revolution of the rotor hub about the axis A1.

The speed of rotation $\Omega$ of the rotor hub about the axis A1 can be determined from these passing instants. Indeed, the azimuth $\psi$ of a blade is equal to the product of the speed of rotation $\Omega$ of the rotor hub about the axis A1 and the time t such that:

$$\psi=\Omega t.$$

Therefore, the angular velocity $\omega_\theta(t)$ of the blade about its pitch axis can be written as follows:

$$\omega_\theta(t)=\Omega \cdot \sin \beta_0 + \Omega \cdot \theta_{1S/TPP} \cdot \cos \psi - \Omega \cdot \theta_{1C/TPP} \cdot \sin \psi. \quad (E7)$$

The first marker attached to the rotor may be positioned on the rotor hub or mast. It does not necessarily coincide with the angular position of a blade attachment. The second marker attached to the fuselage is a fixed point of the fuselage, which can be positioned, for example, at the rear azimuth so that it delivers azimuth information consistent with the conventions usually adopted in the physics of rotorcraft flight. However, this second marker may also be positioned at any azimuth without going beyond the ambit of the invention. The passage instant is acquired by means of a pulse detector indicating when the first marker, attached to the rotor, coincides with the second marker, attached to the fuselage. This pulse detector is, for example, based on a Hall-effect cell and a magnet. The Hall-effect cell is, for example, secured to the fuselage of the rotorcraft, aligned with the second marker, and reacts to the passage of the magnet secured to the rotor and aligned with the first marker.

According to another aspect, the state of the rotor may include:

the longitudinal and lateral inclination angles $\beta_{1C}$ and $\beta_{1S}$ of the tip path plane TPP with respect to the hub plane HP; and/or an aerodynamic force F generated by the rotor.

The aerodynamic force F generated by the rotor can then be deduced from the rotor cone angle $\beta_0$. Consequently, this aerodynamic force F helps balance the rotorcraft during flight and, in particular, this aerodynamic force essentially opposes the apparent mass of the rotorcraft. Consequently, if the aerodynamic drag of the fuselage is disregarded, the current mass M of the rotorcraft can be estimated from i) this aerodynamic force F generated by the rotor, essentially opposing the apparent mass of the rotorcraft, and ii) the specific force $\gamma$ experienced by the fuselage of the rotorcraft, by applying Newton's first law ($M=F/\gamma$). The estimate of the apparent mass may be improved by including in the calculation an estimate of the aerodynamic drag of the fuselage, based on a measurement of its speed relative to air. This improvement allows the current mass M to be estimated more accurately, in particular at high speed.

Thus, the method may include the following complementary steps:

a step of estimating an aerodynamic force F generated by the rotor;

a step of estimating the apparent mass of the rotorcraft; and a step of estimating a current mass M of the rotorcraft.

The method according to the invention may comprise additional steps in order to calculate the longitudinal and lateral inclination angles $\beta_{1C}$ and $\beta_{1S}$ of the tip path plane TPP with respect to the hub plane HP:

measuring a longitudinal cyclic pitch $\theta_{1S/HP}$ and a lateral cyclic pitch $\theta_{1C/HP}$ of a blade with respect to a hub plane HP perpendicular to the axis A1 of the rotor mast; and calculating longitudinal and lateral inclination angles $\beta_{1C}$ and $\beta_{1S}$ of the tip path plane TPP with respect to the hub plane HP, these inclination angles $\beta_{1C}$ and $\beta_{1S}$ of the tip path plane TPP being a function of the estimates of the longitudinal $\theta_{1S/TPP}$ and lateral $\theta_{1C/TPP}$ cyclic pitches with respect to the tip path plane TPP and of the longitudinal $\theta_{1S/HP}$ and lateral $\theta_{1C/HP}$ cyclic pitches of the blade measured with respect to said hub plane HP.

The lateral inclination angle $\beta_{1S}$ of the tip path plane TPP with respect to the hub plane HP is, for example, equal to the difference between the estimate of the lateral cyclic pitch $\theta_{1C/TPP}$ with respect to the tip path plane TPP and the lateral cyclic pitch $\theta_{1C/HP}$ of the blade measured with respect to the hub plane HP in the particular case of a rotor with zero pitch-flap coupling. Similarly, for such a rotor without pitch-flap coupling, the longitudinal inclination angle $\beta_{1C}$ of the tip path plane TPP with respect to the hub plane HP is equal to the difference between the estimate of the longitudinal cyclic pitch $\theta_{1S/TPP}$ with respect to the tip path plane TPP and the longitudinal cyclic pitch $\theta_{1S/HP}$ of the blade measured with respect to the hub plane HP.

For other types of rotor, for example comprising pitch-flap coupling, the pitch-flap coupling coefficient is taken into account in the calculation of the longitudinal and lateral inclination angles $\beta_{1C}$ and $\beta_{1S}$.

The collective pitch $\theta_0$ and the longitudinal $\theta_{1S/HP}$ and/or lateral $\theta_{1C/HP}$ cyclic pitches of the blade with respect to the hub plane HP may be measured at the non-rotating part of a swashplate controlling the collective and cyclic pitch variations of the blades, for example at the servomechanisms actuating this non-rotating part of this swashplate or indeed, in the case of a rotorcraft equipped with conventional flight controls, in the control linkage, or even at a control device, typically a lever or a handle for controlling the collective and cyclic pitches of the blades.

However, measurement as close as possible to the swashplate, while remaining in a non-rotating reference frame, is preferable. Indeed, measurement at a handle for controlling the cyclic pitches of the blades is less precise, in particular because of manufacturing variations of the flight control linkages and/or the operating clearances or elasticities of these linkages.

Furthermore, in the case of rotorcraft with electrical flight controls, such a measurement is easy to obtain because the servomechanisms of this type of rotorcraft typically incorporate an elongation sensor.

The method according to the invention may also comprise a step of calculating a bending moment of the rotorcraft rotor mast based on these inclination angles $\beta_{1C}$, $\beta_{1S}$ along the longitudinal and lateral axes of the rotorcraft.

The relation allowing this bending moment of the mast to be determined as a function of the inclination of the disk involves the moment of inertia of the blades, the speed of rotation of the rotor hub and the eccentricity of the flapping axis of the blades.

Knowing this bending moment of the rotorcraft rotor mast advantageously makes it possible to protect against exceeding a moment critical for the mechanical strength of the rotorcraft. Consequently, the rotorcraft pilot can adapt his piloting and his trajectory in order to remain within flight conditions for which the bending moment of the rotor mast is below this critical moment with a sufficient margin. In the case of a rotorcraft equipped with electric flight controls, this protection can be automated and form part of the protection functions of the flight envelope.

The method may also include a step of performing an assisted or automatic take-off of the rotorcraft by slaving the tip path plane TPP to a predetermined inclination setpoint with respect to the horizontal plane.

Specifically, the inclination angles $\beta_{1C}$, $\beta_{1S}$ along the longitudinal and lateral axes of the rotorcraft define the orientation of the tip path plane TPP with respect to the hub plane HP. In addition, the aerodynamic force F generated by the rotating rotor is perpendicular to this tip path plane TPP. Therefore, by knowing the inclination of this hub plane HP with respect to the horizontal plane (inclination estimated, for example, by an inertial unit), it is possible to deduce therefrom the inclination of the tip path plane TPP with respect to the horizontal plane, and an autopilot of the rotorcraft can perform an assisted or automatic take-off of the rotorcraft by slaving, for example, the tip path plane TPP to a horizontal setpoint, such that the aerodynamic force F generated by the rotating rotor is vertical and thus ensures take-off without the rotorcraft moving in horizontal translation or skidding, regardless of the slope of the ground on which the rotorcraft is positioned and regardless of the speed and direction of the wind at the take-off site.

By way of improvement, the tip path plane TPP may also be slaved to a setpoint slightly inclined with respect to the horizontal plane during such an assisted or automatic take-off of the rotorcraft, in order to counter the thrust of the anti-torque rotor.

This step of performing an assisted or automatic take-off thus makes it possible to slave-control the inclination of the rotor, and more precisely of the tip path plane TPP, and in particular to keep it substantially horizontal, regardless of the slope of the ground on which the rotorcraft is located and regardless of the wind acting on the rotorcraft, while the rotorcraft pilot acts solely on the lever for controlling the collective pitch of the rotor blades in order to perform take-off of the rotorcraft. During this step of performing an assisted or automatic take-off, the control of the cyclic pitches of the rotorcraft rotor blades is, for example, utilized by the slave control. The cyclic pitches of the rotor blades are thus controlled automatically in order to slave the longitudinal and lateral inclination angles of the tip path plane TPP with respect to a horizontal plane in a terrestrial reference frame. To do this, the method utilizes the roll and pitch angles of the rotorcraft obtained, for example, by an inertial unit or indeed an AHRS device in order to determine the orientation of the rotorcraft, and therefore of its hub plane HP and ultimately of its tip path plane TPP, with respect to Earth's gravity.

Direct measurement of the change over time of the angular velocity component $\omega_\theta(t)$ of a blade about the pitch axis can be carried out on at least one blade of the rotor. However, it can advantageously be carried out on several blades, or even on all the blades, of the rotor, in order to reduce latency and to improve the accuracy of the method according to the invention. Furthermore, directly measuring the change in the angular velocity component $\omega_\theta(t)$ on several blades makes it possible to provide the method according to the invention with redundancy by allowing the consistency of the measurements originating from the various blades of the rotor to be monitored, and availability by allowing the detection of a sensor that has failed on one blade, and its exclusion, the sensors of the other blades continuing to be utilized. For example, this measurement is advantageously carried out on all the blades of the rotor, each of the blades comprising a sensor.

Another object of the present invention is a device for determining a state of a rotorcraft rotor, the rotorcraft comprising a fuselage and at least one rotor provided with a mast, a hub and a plurality of blades. Each blade has a first end and a second end, the hub being secured to the mast and rotating about an axis A1 of the mast. Each blade is connected by a first end to the hub, each blade being able to rotate about at least one articulation axis of the blade, the second end of a blade describing, during a rotation of the hub about the axis A1, a trajectory close to a mean plane referred to as the tip path plane TPP.

This device is configured to implement the method as described above in order to estimate the state of the rotorcraft rotor. This device is preferably intended for a blade of a main rotor of the rotorcraft, this main rotor providing lift and propulsion for the rotorcraft. However, this device may be applied to a blade of an anti-torque rear rotor or indeed to a blade of a propeller for propelling a rotorcraft.

This device includes:

at least one memory;

a sensor measuring an angular velocity component $\omega(t)$ of a blade about an articulation axis with respect to an inertial reference frame; and at least one calculator determining the state of the rotorcraft rotor.

The sensor comprises, for example, a rate gyro arranged in a blade, a sensitive axis of the rate gyro being oriented parallel to an articulation axis of the blade, typically the pitch axis of the blade, in order to measure the angular velocity component $\omega(t)$ of the blade about this articulation axis. A sensor may also be arranged in each rotorcraft rotor blade.

The sensor may also comprise a multi-axis rate gyro, typically a triaxial rate gyro, or indeed three rate gyros, whose sensitive axes are oriented, for example, parallel respectively to different axes, not parallel to one another, of the blade, for example parallel respectively to the pitch axis, to the flapping axis and to the drag axis of the blade.

This sensor may also comprise an accelerometer whose sensitive axis is oriented parallel to the flapping axis in order to estimate a static value of the angle of the blade about its drag axis.

The device may also comprise a pulse detector detecting the instants when a first marker attached to the rotor passes in front of a second marker attached to the fuselage in order to deliver a pulse each time the first marker passes in front of the second marker so as, for example, to interpolate the azimuth $\psi$ of the blade about the axis A1 and/or the speed of rotation $\Omega$ of the rotor hub about the axis A1 of the rotor mast.

In addition, the rotorcraft may comprise an AHRS device providing, in particular, specific forces experienced by the fuselage of the rotorcraft and the inclination angles of the fuselage of the rotorcraft about its roll and pitch axes.

The sensor may comprise an accelerometer whose sensitive axis is oriented parallel to the flapping axis of the blade and one or more rate gyros arranged in a blade, whose sensitive axes are oriented respectively parallel to different and non-parallel directions. The invention therefore makes it possible to measure the three degrees of freedom of the blade respectively about the pitch axis, the flapping axis and the drag axis of the blade. In this way, actual angular displacements of the articulations of the blade can be determined in order to predict damage to laminated articulation(s) or ball joint(s), such as a spherical thrust-bearing, and thus improve the organization of their maintenance.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

Figure 1:
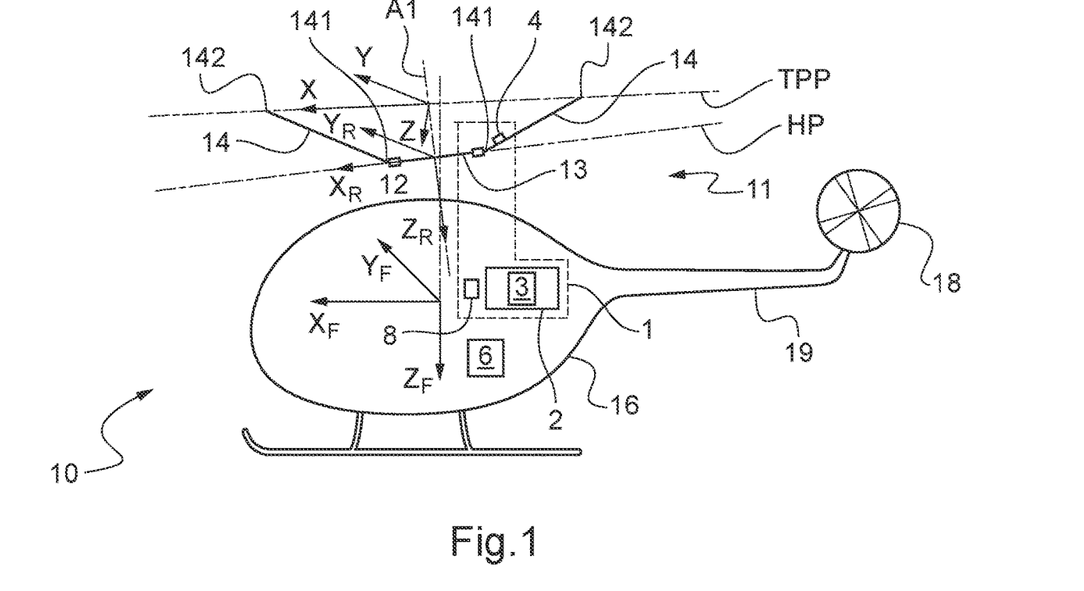
FIGS. 1 to 3 show rotorcraft equipped with a device for determining a state of a rotorcraft rotor.
Figure 2:
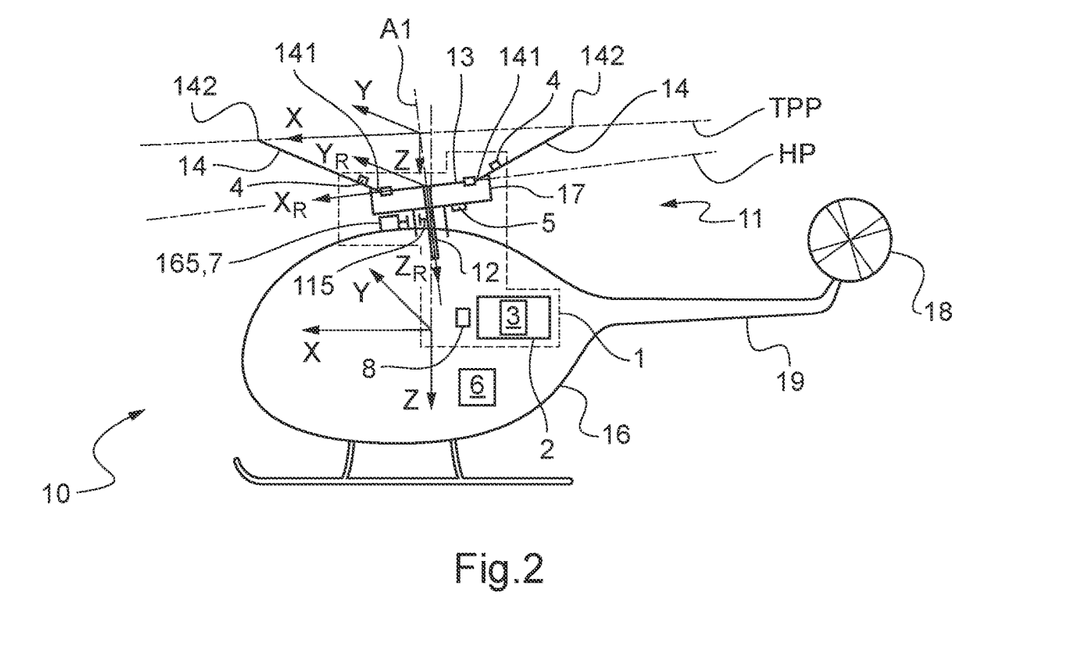
Figure 3:
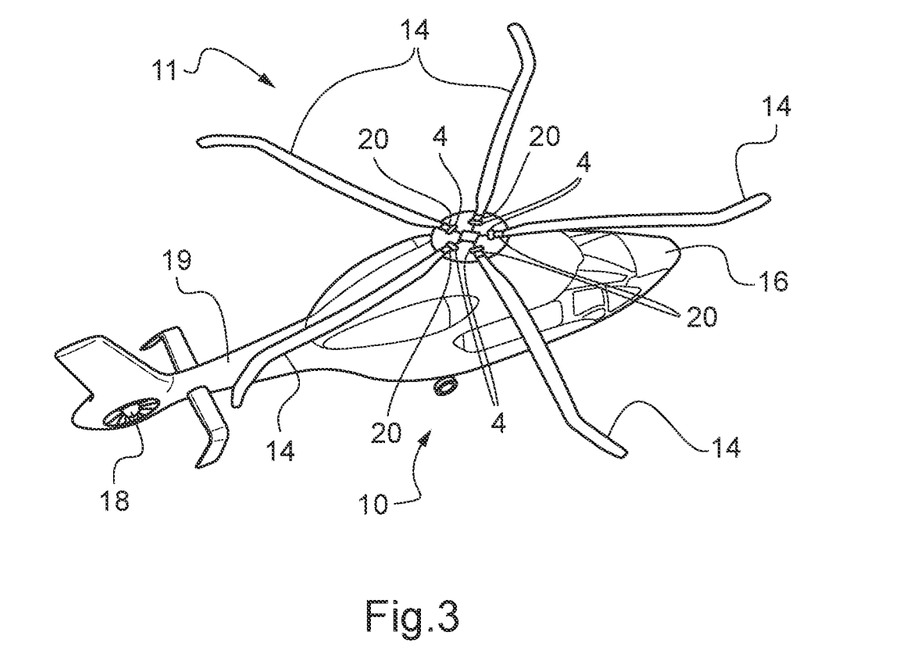

As shown in FIGS. 1 to 3, a rotorcraft 10 comprises a main rotor 11 positioned above a fuselage 16 of the rotorcraft 10 and an anti-torque rear rotor 18 positioned at the rear end of a tail boom 19.

A body frame ($X_F$, $Y_F$, $Z_F$) is attached to the fuselage 16 of this rotorcraft 10. A longitudinal axis $X_F$ of the fuselage 16 of the rotorcraft 10 is oriented from the rear of the rotorcraft 10 towards the front of the rotorcraft 10. A normal axis $Z_F$ is oriented from top to bottom perpendicular to the longitudinal axis $X_F$, and a lateral axis $Y_F$ is oriented from left to right perpendicular to the longitudinal $X_F$ and normal $Z_F$ axes.

The main rotor 11 comprises a mast 12, a hub 13 and blades 14. Each blade 14 has a first end 141 connected to the hub 13 and a second free end 142 as well as a leading edge 143 and a trailing edge 144. The mast 12 is secured to the hub 13 and rotates the hub 13 and the blades 14 about an axis A1 of the mast 12.

Figure 4:
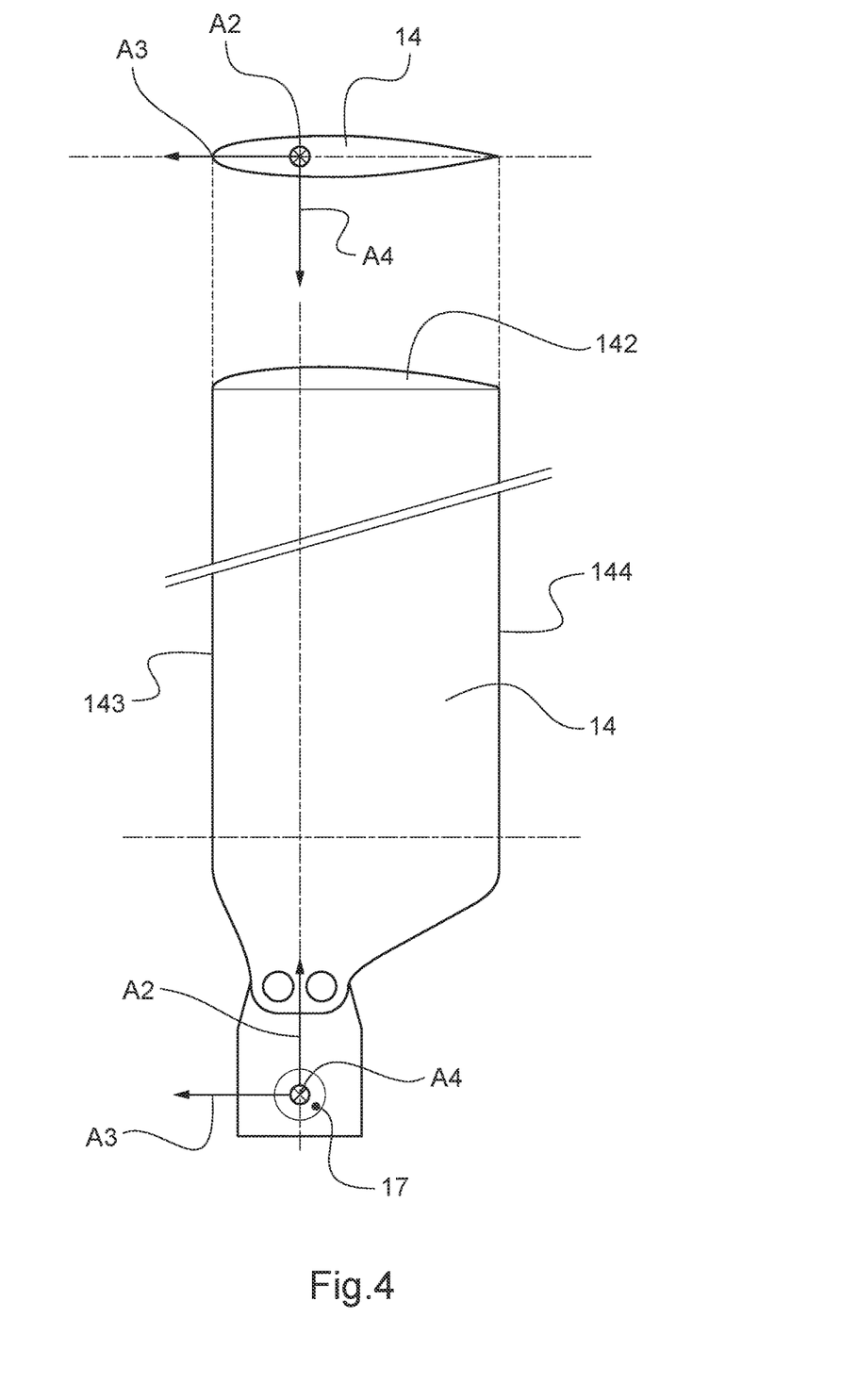
FIGS. 4 to 7 show views of a blade.

Each blade 14 is also able to rotate about at least one articulation axis, for example about its pitch axis A2, as well as about its flapping axis A3 and its drag axis A4, as shown in FIG. 4.

Figure 5:
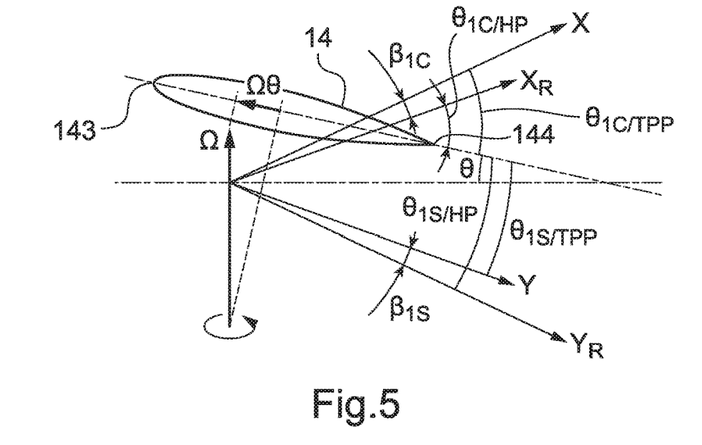

FIG. 5 shows the blade 14 and its pitch angle $\theta$.

Figure 6:
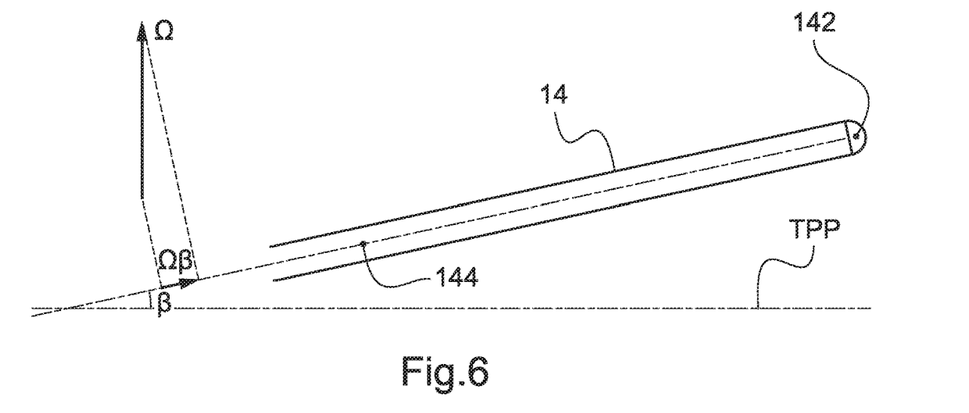

FIG. 6 shows the blade 14 and its flap angle $\beta$.

Figure 7:
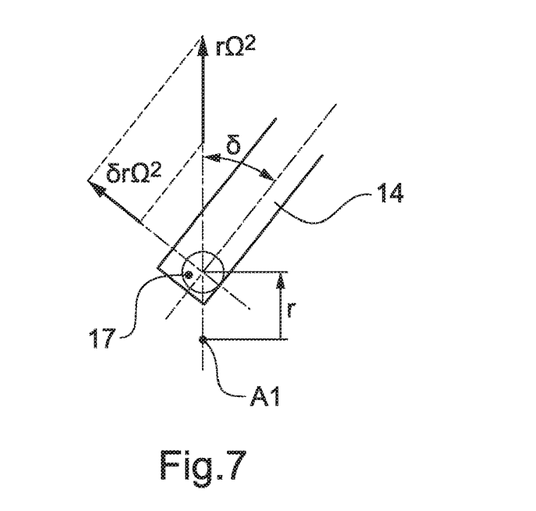

FIG. 7 shows the blade 14 and its drag angle $\delta$.

Consequently, during a rotation of the hub 13 about the axis A1, each point of the hub 13 moves in a hub plane HP perpendicular to the axis A1 of the mast 12 while the second free end 142 of each blade 14 describes a substantially planar trajectory, close to a mean plane referred to as the "tip path plane TPP". The trajectory of the second free end 142 of each blade 14 actually experiences slight fluctuations on either side of the tip path plane TPP, which can generally be disregarded. The projection of this trajectory in the tip path plane TPP is substantially circular.

For example, the pitch axis A2 may be constituted by a straight line contained in the blade 14, integral with the blade 14 and forming a radius of the rotor disk. Likewise, the flapping axis A3 may be constituted by a straight line integral with the blade 14, perpendicular to the pitch axis A2, and whose direction is a tangent to the periphery of the rotor disk at the tip of the free end 142 of said blade 14. The drag axis A4 may be constituted by a straight line integral with the blade 14 and normal to the plane of the rotor disk.

Furthermore, each blade 14 may be connected to the hub 13, for example by means of three mechanical articulations, or indeed by means of a flexible connection, or indeed by means of a spherical thrust-bearing 17 acting alone as the three articulations. In addition, each blade 14 forms a rotor disk during rotation of the hub 13 about the axis A1 of the mast 12.

Another body frame ($X_R$, $Y_R$, $Z_R$) is also connected to the fuselage 16 of the rotorcraft 10 and is more precisely integral with the hub plane HP. This other body frame ($X_R$, $Y_R$, $Z_R$) is non-rotating with respect to the fuselage 16 of the rotorcraft 10, a longitudinal axis $X_R$ being formed by a projection on the hub plane HP of the longitudinal axis $X_F$ of the body frame ($X_F$, $Y_F$, $Z_F$), a lateral axis $Y_R$ being formed by a projection on the hub plane HP of the lateral axis $Y_F$ and a normal axis $Z_R$ being oriented perpendicular to the hub plane HP, from top to bottom.

A reference frame (X, Y, Z) may also be integral with the tip path plane TPP. This reference frame (X, Y, Z) is non-rotating with respect to the fuselage 16 of the rotorcraft 10, a longitudinal axis X being formed by a projection on the tip path plane TPP of the longitudinal axis $X_F$ of the body frame ($X_F$, $Y_F$, $Z_F$), a lateral axis Y being formed by a projection on the tip path plane TPP of the lateral axis $Y_F$ and a normal axis Z being oriented perpendicular to the tip path plane TPP, from top to bottom.

The rotorcraft 10 comprises a device 1 for determining a state of the main rotor 11 of the rotorcraft 10. This device 1 is based principally on utilizing the sinusoidal oscillations of at least one blade 14 of the main rotor 11 of the rotorcraft 10 about at least one articulation axis of this blade 14 in order to determine this state of the main rotor 11 of the rotorcraft 10.

However, this device 1 can also be adapted in order to determine the state of the rear rotor 18 of the rotorcraft 10 by utilizing the sinusoidal oscillations of at least one blade of the rear rotor 18 of the rotorcraft 10 about at least one articulation axis of this blade.

The device 1 for determining a state of the main rotor 11 of the rotorcraft 10 may be based on utilizing the sinusoidal oscillations of the pitch of at least one blade 14 of the main rotor 11 about its pitch axis A2. The device 1 may also be based on utilizing the sinusoidal oscillations of the movements of a blade 14 about its flapping axis A3 and/or its drag axis A4.

The state of the rotor comprises, in particular, a longitudinal cyclic pitch $\theta_{1S/TPP}$ and a lateral cyclic pitch $\theta_{1C/TPP}$ of a blade 14 of the main rotor 11 with respect to said tip path plane TPP. The state of the rotor may also comprise the cone angle $\beta_0$ of the blade 14 as well as longitudinal and lateral inclination angles $\beta_{1C}$ and $\beta_{1S}$ of the tip path plane TPP with respect to the hub plane HP and/or an aerodynamic force F generated by the main rotor 11.

The device 1 for determining a state of the main rotor 11 of the rotorcraft 10 comprises a calculator 2 provided with a memory 3. In addition, the device 1 includes a sensor 4 on at least one blade 14 of the main rotor 11. This device 1 is configured to implement a method for determining a state of the main rotor 11 of the rotorcraft 10 in order to determine the state of the main rotor 11 of the rotorcraft 10.

The memory 3 of the calculator 2 stores at least one executable code of an algorithm for carrying out this method. The calculator 2 executes this code. The calculator 2 may, for example, comprise at least one processor and at least one memory, or at least one programmable logic array, at least one integrated circuit, at least one programmable system, at least one logic circuit, at least one analog circuit, these examples not limiting the scope given to the expression "calculator". The calculator 2 may be a calculator dedicated to carrying out this method or indeed a calculator of the rotorcraft 10 having a plurality of functions.

The sensor 4 comprises, for example, at least one rate gyro arranged in a blade 14. A sensitive axis of the rate gyro may be oriented parallel to the pitch axis A2 of the blade 14. The sensor 4 measures an angular velocity component $\omega_\theta(t)$ of a blade 14 about the pitch axis A2 of this blade 14 with respect to an inertial reference frame. In this way, the sensor 4 makes it possible to measure the change over time of this angular velocity component $\omega_\theta(t)$ of a blade 14 about its pitch axis A2 with respect to an inertial reference frame. The measurement $\omega_\theta$ of a rate gyro whose sensitive axis is oriented parallel to the pitch axis A2 may be written as follows:

$$\omega_\theta = \dot{\theta} + \Omega \cdot \beta \approx \Omega \cdot (\beta_0 + \theta_{1S} \cdot \cos\psi - \theta_{1C} \cdot \sin\psi),$$

$\dot{\theta}$ being the derivative with respect to time of the pitch angle of the blade 14;

$\Omega$ being the speed of rotation of the hub 13 of the rotor 11;

$\beta$ being the flap angle of the blade 14;

$\beta_0$ being the mean flap angle, or cone angle or elevation angle of the blade 14 with respect to the tip path plane TPP (by definition of the tip path plane TPP, the sine and cosine components of the flap angle, $\beta_{1c}$ and $\beta_{1s}$, are zero when they are referenced to this plane, hence the equality $\beta = \beta_0$) and;

$\theta_{1S}$ and $\theta_{1C}$ being the longitudinal and lateral cyclic pitches of the blade 14.

A sensitive axis of the rate gyro may also be oriented parallel to the flapping axis A3 of the blade 14. The sensor 4 measures an angular velocity component $\omega_\beta(t)$ of a blade 14 about the flapping axis A3 of this blade 14 with respect to an inertial reference frame. In this way, the sensor 4 makes it possible to measure the change over time of this angular velocity component $\omega_\beta(t)$ of a blade 14 about its flapping axis A3 with respect to an inertial reference frame. The measurement $\omega_\beta$ of a rate gyro whose sensitive axis is oriented parallel to the flapping axis A3 may be written as follows:

$$\omega_\beta = \dot{\beta} + \Omega \cdot \theta \approx \Omega \cdot (\theta_0 + \theta_{1S} \cdot \sin\psi + \theta_{1C} \cdot \cos\psi),$$

$\dot{\beta}$ being the derivative with respect to time of the flap angle (zero when the reference plane is the tip path plane TPP);

$\Omega$ being the speed of rotation of the hub 13 of the rotor 11;

$\theta$ being the pitch angle of the blade 14;

$\theta_0$ being the collective pitch of the blade 14; and $\theta_{1S}$ and $\theta_{1c}$ being the longitudinal and lateral cyclic pitches of the blade 14.

A sensitive axis of the rate gyro may also be oriented parallel to the drag axis A4 of the blade 14. The sensor 4 measures an angular velocity component $\omega_\delta(t)$ of a blade 14 about the drag axis A4 of this blade 14 with respect to an inertial reference frame. In this way, the sensor 4 makes it possible to measure the change over time of this angular velocity component $\omega_\delta(t)$ of a blade about its drag axis A4 with respect to an inertial reference frame. The measurement $\omega_\delta$ of a rate gyro whose sensitive axis is oriented parallel to the drag axis A4 may be written as follows:

$$\omega_\delta = \dot{\delta} + \Omega,$$

$\dot{\delta}$ being the derivative with respect to time of the drag angle; and $\Omega$, the speed of rotation of the hub 13 of the rotor 11.

The sensor 4 may also comprise a multi-axis rate gyro or indeed two rate gyros whose sensitive axes may be oriented respectively parallel to the pitch axis and the flapping axis A3 of the blade 14. In this way, the sensor 4 makes it possible to measure the change over time of the angular velocity components $\omega_\theta(t)$, $\omega_\beta(t)$ and $\omega_\delta(t)$ of a blade 14 respectively about its pitch axis A2, its flapping axis A3 and its drag axis A4 with respect to an inertial reference frame.

The sensor 4 may also comprise a triaxial rate gyro or indeed three rate gyros whose sensitive axes may be oriented respectively parallel to the pitch axis A2, the flapping axis A3 and the drag axis A4 of the blade 14.

The sensor 4 may also comprise an accelerometer whose sensitive axis is oriented parallel to the flapping axis A3 of the blade 14 in order to estimate a static value of the angle of the blade 14 about its drag axis A4. This accelerometer may be positioned, for example, vertically in line with a spherical thrust-bearing 17, as shown in FIG. 7. The measurement $\gamma_\beta$ of this accelerometer positioned in this way can thus be written as follows:

$$\gamma_\beta = \delta \cdot r \cdot \Omega^2,$$

$\delta$ being the drag angle;

$r$ being the distance between the accelerometer and the axis of rotation A1; and $\Omega$ being the speed of rotation of the hub 13 of the rotor 11.

Since the distance $r$ and the speed of rotation $\Omega$ are known, it is thus possible to deduce the drag angle $\delta(t)$ and, in particular, its mean or static component $\delta_0$.

In addition, the rotorcraft 10 may comprise an AHRS device 6 supplying, in particular, specific forces applied to the fuselage 16 of the rotorcraft 10, for example along the axes $X_F$, $Y_F$, $Z_F$.

The rotorcraft 10 shown in FIG. 1 comprises a single sensor 4 arranged on a blade 14 of the main rotor 11.

According to FIG. 2 and FIG. 3, the rotorcraft 10 comprises several sensors 4, one sensor 4 being arranged on each blade 14 of the main rotor 11 of the rotorcraft 10.

For example, according to FIG. 3, the rotorcraft 10 comprises five blades 14 and five sensors 4. For example, one sensor 4 is positioned at the sleeve 20 of each blade 14.

The rotorcraft 10 shown in FIGS. 1 and 2 has the axis A1 of the mast 12 of its rotor 11 inclined by a few degrees. This inclination is typically between 3° and 4° with respect to the normal axis $Z_F$, towards the front. Consequently, the hub plane HP is inclined with respect to a plane formed by the longitudinal $X_F$ and lateral $Y_F$ axes.

In the rotorcraft 10 shown in FIG. 2, the device 1 may also comprise a pulse detector 5 detecting instants when a first marker 115 attached to the main rotor 11 passes in front of a second marker 165 attached to the fuselage 16. The pulses generated by this pulse detector 5 thus enable the calculator 2 to determine the azimuth $\psi$ of each blade 14 about the axis A1 of the mast 12 of the rotor 11 as well as the speed of rotation $\Omega$ of the hub 13 about its axis A1. This pulse detector 5 comprises, for example, a Hall-effect cell secured to the second marker 165 of the fuselage 16, and a magnet positioned secured to the first marker 115 of the main rotor 11.

The rotorcraft 10 may also comprise a complementary sensor 7 arranged, for example, on a non-rotating part of a swashplate 17 controlling the pitch variations of the blades 4 as shown in FIG. 2 or indeed at each servomechanism actuating the non-rotating part of this swashplate 17 or indeed at a device for controlling the pitch variation of the blades 4. This complementary sensor 7 can thus directly or indirectly measure a pitch angle $\theta_{HP}$ with respect to the hub plane HP.

Figure 8:
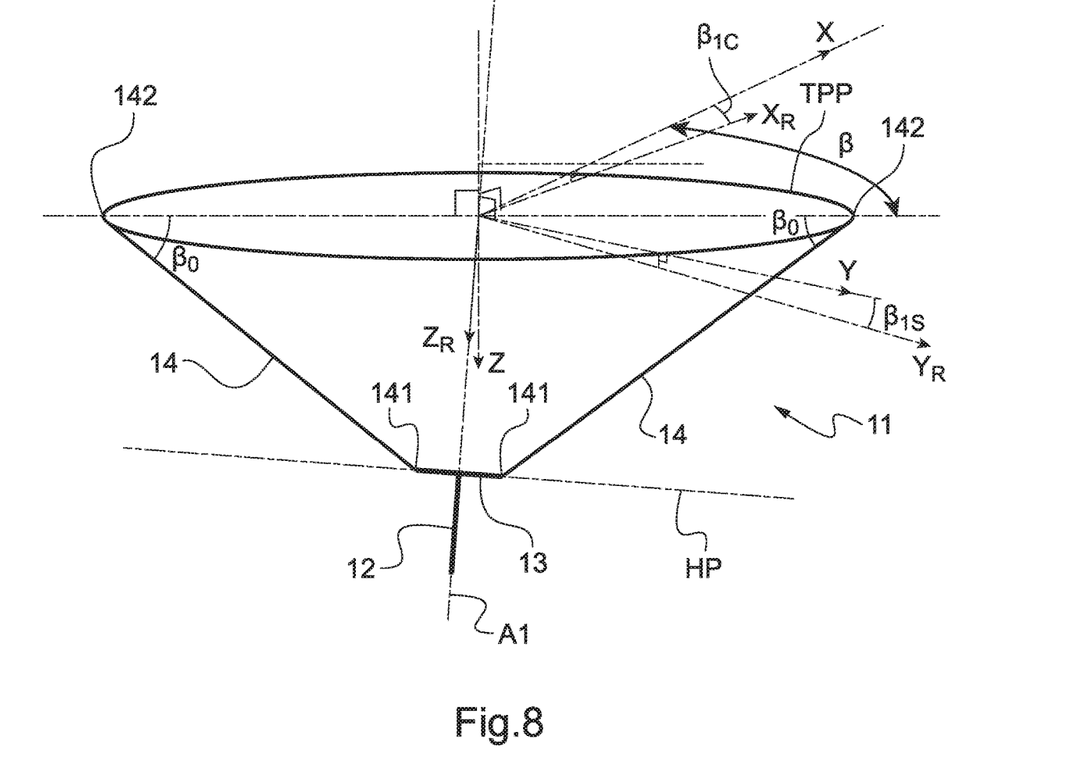
FIG. 8 shows a schematic representation of the rotor disk.

FIG. 8 schematically shows the rotor 11 as well as the tip path plane TPP and the hub plane HP. Since the tip path plane TPP and the hub plane HP are generally not parallel, the longitudinal $\theta_{1S}$ and lateral $\theta_{1C}$ cyclic pitches of each blade 14 of the rotor 11 are different depending on whether they are measured with respect to the tip path plane TPP or indeed with respect to the hub plane HP. The relations for the transition between these two reference planes are written, for example for a rotor 11 having zero pitch-flap coupling, as follows:

$$\theta_{1C/TPP} = \theta_{1C/HP} + \beta_{1S}, \tag{E3}$$

$$\theta_{1S/TPP} = \theta_{1S/HP} - \beta_{1C}, \tag{E4}$$

where:

$\theta_{1S/TPP}$ and $\theta_{1C/TPP}$: longitudinal and lateral cyclic pitches of a blade 14 of the rotor 11 with respect to the tip path plane TPP;

$\theta_{1S/HP}$ and $\theta_{1C/HP}$: longitudinal and lateral cyclic pitches of a blade 14 of the rotor 11 with respect to the hub plane HP; and $\beta_{1C}$ and $\beta_{1S}$, the inclination of the tip path plane TPP with respect to the hub plane HP, respectively longitudinally (i.e., about the lateral axis $Y_F$) and laterally (i.e., about the longitudinal axis $X_F$).

For a rotor 11 having non-zero pitch-flap coupling, the relations for the transition between reference planes may comprise a corrective term, namely the pitch-flap coupling coefficient.

The pitch angle $\theta$ comprises a collective component $\theta_0$ and a cyclic component that can be resolved into a longitudinal cyclic component $\theta_{1S}$ and a lateral cyclic component $\theta_{1C}$.

The method for determining a state of the main rotor 11 of the rotorcraft 10 that can be implemented by the device 1 comprises at least the following two steps:

directly measuring the change over time of an angular velocity component $\omega_\theta(t)$ of a blade 14 about its pitch axis A2 with respect to an inertial reference frame; and determining a state by processing the angular velocity component $\omega_\theta(t)$.

The angular velocity $\omega_\theta(t)$ of a blade 14 about its pitch axis A2 in the reference frame (X,Y,Z) attached to the tip path plane TPP is first measured by a sensor 4 arranged on this blade 14. This angular velocity $\omega_\theta(t)$ is equal to the derivative with respect to time of the angle $\theta_{TPP}$ of this blade 14 in the same reference frame (X,Y,Z) and can therefore be expressed in the form of a limited Fourier series development as a function of the angular orientation $\Omega \cdot t$ of the rotor 11 about the axis A1 such that:

$$\omega_\theta(t) = \Omega \cdot \sin\beta_0 + \Omega \cdot \theta_{1S/TPP} \cdot \cos(\Omega \cdot t) - \Omega \cdot \theta_{1C/TPP} \cdot \sin(\Omega \cdot t), \quad \text{(E6)}$$

where:

$\Omega \cdot \sin\beta_0$: mean value, or continuous component;

$(\Omega \cdot \theta_{1S/TPP})$ and $(-\Omega \cdot \theta_{1C/TPP})$: harmonic coefficients of order 1, corresponding to the frequency $\Omega/2\pi$; and $\beta_0$: cone angle or elevation angle of the blade with respect to the tip path plane TPP, defined between the tip path plane TPP and the blade 14.

Figure 9:
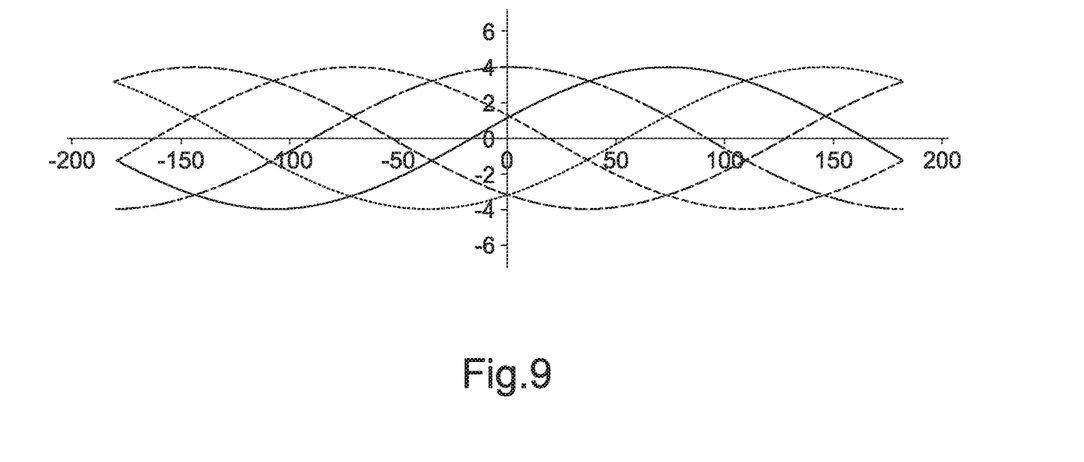
FIG. 9 shows a graph representing the change over one complete revolution of a rotor of an angular velocity component $\omega_\theta(t)$ of each blade of this rotor about its pitch axis.

FIG. 9 comprises a graph showing the change over one complete revolution of the rotor 11 of the angular velocity components $\omega_\theta(t)$ of each of the five blades 14 of the rotor 11 about their pitch axis A2. This graph shows the signals from the five sensors 4 equipping the five blades 14 of the main rotor 11 of the rotorcraft 10 shown in FIGS. 2 and 3.

From the expression (E6) of the angular velocity $\omega_\theta(t)$ of a blade 14, the cone angle $\beta_0$ as well as the longitudinal cyclic pitch $\theta_{1S/TPP}$ and the lateral cyclic pitch $\theta_{1C/TPP}$ of the blade 14 with respect to the tip path plane TPP, constituting a state of the rotor 11, can be estimated following this processing solely of the angular velocity component $\omega_\theta(t)$, for example by a harmonic analysis, by means of the calculator 2, according to at least one of the following known methods:

Fourier series decomposition;

solving a system of three equations with three unknowns utilizing the instantaneous measurements on three different blades 14;

solving a system of five equations with three unknowns utilizing the instantaneous measurements of the five blades 14, the 5/3 overdetermination being solved, for example, by the least squares method;

synchronous demodulation;

recursive least squares method;

non-recursive least squares method; and

Kalman filtering.

These estimates of the cone angle $\beta_0$ and of the longitudinal $\theta_{1S/TPP}$ and lateral $\theta_{1C/TPP}$ cyclic pitches of the blade 14 are determined by extracting, respectively, a mean value of the angular velocity $\omega_\theta(t)$, as well as an amplitude and a phase of the sinusoidal component of order 1 of the angular velocity $\omega_\theta(t)$ by means of the calculator 2.

The method may comprise an intermediate step of measuring the instant when the first marker 115 attached to the rotor 11 passes in front of the second marker 165 attached to the fuselage 16 by means of the pulse detector 5 such that the calculator 2 can determine the azimuth $\psi$ and the speed of rotation $\Omega$ of each blade 14 about the axis A1 and, in particular, of each blade 14 equipped with a sensor 4. Subsequently, the calculator 2 may determine the phase of the sinusoidal component of the angular velocity $\omega_\theta(t)$ of the blade 14 about its pitch axis A2.

In addition, the state of the rotor may include the longitudinal and lateral inclination angles $\beta_{1C}$ and $\beta_{1S}$ of the tip path plane TPP with respect to the hub plane HP and/or an aerodynamic force F generated by the rotor 11.

In order to determine these inclination angles $\beta_{1C}$ and $\beta_{1S}$ of the tip path plane TPP with respect to the hub plane HP, the method may include the following additional steps:

measuring a longitudinal cyclic pitch $\theta_{1S/HP}$ and a lateral cyclic pitch $\theta_{1C/HP}$ of the blade 14 with respect to the hub plane HP perpendicular to the axis A1, by means of the complementary sensor 7; and calculating longitudinal and lateral inclination angles $\beta_{1C}$ and $\beta_{1S}$ of the tip path plane TPP with respect to the hub plane HP, as functions of the longitudinal $\theta_{1S/HP}$ and lateral $\theta_{1C/HP}$ cyclic pitches of the blade 14 measured with respect to the hub plane HP and estimates of the longitudinal $\theta_{1S/TPP}$ and lateral $\theta_{1C/TPP}$ cyclic pitches of the blade 14 with respect to the tip path plane TPP. Where appropriate, these functions also involve the pitch-flap coupling coefficient.

The method may also include a step of calculating a bending moment of the mast 12 of the rotor 11. Knowing this bending moment of the mast 12 of the main rotor 11 of the rotorcraft 10 advantageously makes it possible to estimate the mechanical stresses experienced by the mast 12 of the main rotor 11 in particular. This bending moment of the mast 12 is determined as a function of the moment of inertia of the blades 14, the speed of rotation $\Omega$ of the hub of the rotor 11 and of the eccentricity of the flapping axis A3 of the blades 14.

The method may also comprise a step of performing an assisted or automatic take-off of the rotorcraft 10 by slaving the tip path plane TPP to a predetermined inclination set point with respect to a horizontal plane of a terrestrial reference frame defined perpendicularly to the direction of terrestrial gravity. During this stage of performing an assisted or automatic take-off of the rotorcraft 10, a pilot of the rotorcraft 10 acts solely on a lever for controlling the collective pitch of the blades 14 of the rotor 11, the cyclic pitches of the blades 14 of the rotor 11 of the rotorcraft 10 being controlled automatically in order to slave the longitudinal and lateral inclination angles of the tip path plane TPP with respect to a horizontal plane in a terrestrial reference frame, possibly utilizing the roll and pitch angles of the fuselage of the rotorcraft measured, for example, by the AHRS device 6.

The method may also comprise a step of estimating an aerodynamic force F generated by the rotor 11, a step of estimating the apparent mass of the rotorcraft 10 and a step of estimating a current mass M of the rotorcraft 10.

The cone angle $\beta_0$ makes it possible to determine in a known manner the aerodynamic force F generated by the rotor 11. This aerodynamic force F helps balance the rotorcraft 10 during flight by opposing, in particular, the apparent mass of the rotorcraft 10 during hovering flight. The current mass M of the rotorcraft 10 can then be estimated as a function of this aerodynamic force F generated by the rotor 11, this apparent mass of the rotorcraft 10 and the specific force experienced by the rotorcraft 10 determined, for example, by the AHRS device 6.

Furthermore, the main rotor 11 may comprise spherical thrust-bearings 17 respectively connecting a blade 14 to the hub 13. Estimates of the three deflection angles of each spherical thrust-bearing 17 can be determined by means of the sensor 4 so as to determine the mechanical stresses experienced by each spherical thrust-bearing 17. Thereafter, damage to each spherical thrust-bearing 17 can be predicted in order to reduce the maintenance costs of the spherical thrust-bearings 17.

Naturally, the present invention may be subjected to numerous variations as to its implementation. Although several embodiments are described above, it should readily be understood that it is not conceivable to identify exhaustively all possible implementations. It is naturally possible to replace any of the means described with equivalent means without going beyond the ambit of the present invention.

What is claimed is:

1. A method for determining a state of a rotor of a rotorcraft, the rotorcraft comprising a fuselage and at least one rotor provided with a mast, a hub, and a plurality of blades, each blade comprising a first end and a second end, the hub connected to the mast and rotating about an axis of the mast, each blade connected by the first end to the hub, each blade being able to rotate about at least one articulation axis of the blade, the second end of each blade defining, during a rotation of the hub about the axis of the mast, a trajectory close to a mean plane referred to as the tip path plane, wherein the method comprises:
directly measuring the change over time of an angular velocity component of one blade about the articulation axis with respect to an inertial reference frame; and
determining a state of the rotor by processing solely the angular velocity component, the state of the rotor comprising a longitudinal cyclic pitch and a lateral cyclic pitch of the blade with respect to the tip path plane determined by extracting an amplitude and a phase of a fundamental sinusoidal component of the angular velocity of the blade about the articulation axis, wherein the fundamental sinusoidal component has a frequency equal to that of rotation of the hub of the rotor about the axis of the mast;
wherein the state of the rotor further comprises an elevation angle of the blade with respect to the tip path plane and longitudinal and lateral inclination angles of the tip path plane with respect to a plane of the hub perpendicular to the axis of the mast;
wherein the method includes a step of performing an assisted or automatic take-off of the rotorcraft by slaving the tip path plane according to a predetermined inclination setpoint with respect to a horizontal plane; and wherein, during the step of performing an assisted or automatic take-off of the rotorcraft, a pilot of the rotorcraft acts solely on a lever for controlling the collective pitch of the blades of the rotor, the cyclic pitches of the blades of the rotor being controlled automatically in order to slave the longitudinal and lateral inclination angles of the tip path plane with respect to a horizontal plane, regardless of the slope of the ground and regardless of the wind acting on the rotorcraft.

2. The method according to claim 1,
wherein, during the step of determining a state of the rotor, the processing operation is a harmonic analysis of the angular velocity component.

3. The method according to claim 1,
wherein the method comprises an intermediate step of detecting the instant a first marker attached to the rotor passes in front of a second marker attached to the fuselage.

4. The method according to claim 1,
wherein the extraction of the amplitude and the phase of the fundamental sinusoidal component of the angular velocity of the blade about the articulation axis is carried out by at least any one of the following methods:

Fourier series decomposition;
solving a system of two equations with two unknowns utilizing the instantaneous measurements on two different blades;
least squares estimation of the two unknowns of a system of equations utilizing the instantaneous measurements on more than two different blades;
synchronous demodulation;
recursive least squares method;
non-recursive least squares method; and
Kalman filtering.

5. The method according to claim 1,
wherein the state of the rotor further comprises a cone angle of the rotor determined by extracting a mean value of the fundamental sinusoidal component of the angular velocity of the blade about the articulation axis by at least any one of the following methods:

Fourier series decomposition;
solving a system of three equations with three unknowns utilizing the instantaneous measurements on three different blades;
least squares estimation of the three unknowns of a system of equations utilizing the instantaneous measurements of more than three different blades;
synchronous demodulation;
recursive least squares method;
non-recursive least squares method; and
Kalman filtering.

6. The method according to claim 1,
wherein the method comprises the following additional steps:
measuring a longitudinal cyclic pitch and a lateral cyclic pitch of the blade with respect to the hub plane; and
calculating longitudinal and lateral inclination angles of the tip path plane with respect to the hub plane, the inclination angles of the tip path plane being a function of the longitudinal and lateral cyclic pitches of the blade measured with respect to the hub plane and the estimates of the longitudinal and lateral cyclic pitches of the blade with respect to the tip path plane.

7. The method according to claim 6,
wherein, during the step of measuring a longitudinal the blade, cyclic pitch and a lateral cyclic pitch of the longitudinal cyclic pitch and the lateral cyclic pitch of the blade are measured at a non-rotating part of a swashplate controlling the collective and cyclic pitch variations of the blade, at servomechanisms actuating the non-rotating part of the swashplate or indeed at a device for controlling the collective and cyclic pitches of the blade.

8. The method according to claim 1,
wherein the method also includes a step of calculating a bending moment of the mast of the rotor.

9. A device for determining a state of a rotor of a rotorcraft, the rotorcraft comprising a fuselage and at least one rotor provided with a mast, a hub, and a plurality of blades, each blade comprising a first end and a second end, the hub being connected to the mast and rotating about an axis of the mast, each blade being connected by a first end to the hub, each blade being able to rotate about an articulation axis of the blade, the second end of a blade describing, during a rotation about the axis of the mast, a trajectory close to a mean plane referred to as the tip path plane;
wherein the device is configured to implement the method according to claim 1, and comprises:
at least one memory;
a sensor measuring a change over time of an angular velocity component of a blade about the articulation axis with respect to an inertial reference frame; and
at least one calculator determining the state of the rotor.

10. The device according to claim 9,
wherein the sensor is a rate gyro arranged in a blade, a sensitive axis of the rate gyro being oriented parallel to the articulation axis of the blade in order to measure the angular velocity component of the blade about the articulation axis.

11. The device according to claim 9,
wherein the rotor comprising spherical thrust-bearings, one spherical thrust-bearing connecting a blade to the hub, the sensor comprises an accelerometer whose sensitive axis is oriented parallel to a flapping axis of the blade and one or more rate gyros arranged in a blade, whose sensitive axes are oriented respectively parallel to a pitch axis, the flapping axis and a drag axis of the blade in order to estimate a deflection angle of each spherical thrust-bearing SO as to determine the mechanical stresses experienced by the spherical thrust-bearing, predict damage to the spherical thrust-bearing, and reduce the maintenance costs of the spherical thrust-bearing.

12. The device according to claim 9,
wherein the device includes a pulse detector measuring instants a first marker attached to the rotor passes in front of a second marker attached to the fuselage.

13. A rotorcraft comprising:
a fuselage and a rotor, the rotor provided with a mast, a hub, and a plurality of blades, each blade comprising a first end and a second end, the hub being connected to the mast and being rotatable about an axis of the mast, each blade being connected by a first end to the hub, each blade being able to rotate about an articulation axis of the blade, the second end of each blade describing, during a rotation of the hub about about the axis of the mast, a trajectory close to a mean plane referred to as the tip path plane;
a device comprising a sensor and a calculator,
the sensor configured to measure a change over time of an angular velocity component of a blade about the articulation axis with respect to an inertial reference frame, and
the calculator configured to determine a state of the rotor, the state of the rotor comprising a longitudinal cyclic pitch and a lateral cyclic pitch of the blade with respect to the tip path plane determined by extracting an amplitude and a phase of a fundamental sinusoidal component of the angular velocity of the blade about the articulation axis, wherein the fundamental sinusoidal component has a frequency equal to that of rotation of the hub of the rotor about the axis of the mast;
wherein the state of the rotor further comprises an elevation angle of the blade with respect to the tip path plane and longitudinal and lateral inclination angles of the tip path plane with respect to a plane of the hub perpendicular to the axis of the mast; and
an autopilot configured to perform an assisted or automatic take-off of the rotorcraft by slaving the tip path plane according to a predetermined inclination setpoint with respect to a horizontal plane, wherein, during the assisted or automatic take-off of the rotorcraft being performed, a pilot of the rotorcraft acts solely on a lever for controlling the collective pitch of the blades of the rotor, the cyclic pitches of the blades of the rotor being controlled automatically in order to slave the longitudinal and lateral inclination angles of the tip path plane with respect to a horizontal plane, regardless of the slope of the ground and regardless of the wind acting on the rotorcraft.

* * * * *